(12) United States Patent
Fukumoto (10) Patent No.: US 8,131,807 B2
(45) Date of Patent: Mar. 6, 2012

(54) COMMUNICATION APPARATUS (75) Inventor: Yuji Fukumoto, Fuchu (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 196 days.

(21) Appl. No.: 12/181,428

(22) Filed: Jul. 29, 2008

(65) Prior Publication Data
US 2009/0055494 A1 Feb. 26, 2009

(30) Foreign Application Priority Data

Aug. 23, 2007 (JP) .............................. P2007-217358

(51) Int. Cl.
G06F 15/16 (2006.01)
(52) U.S. Cl. ..................................................... 709/206
(58) Field of Classification Search .................. 709/206
See application file for complete search history.

(56) References Cited

U.S. PATENT DOCUMENTS
7,447,742 B1 * 11/2008 Yamamoto .................... 709/206
(Continued)

FOREIGN PATENT DOCUMENTS
JP 2005-316650 A 11/2005

*Primary Examiner* — Vivek Srivastava
*Assistant Examiner* — William Goodchild
(74) *Attorney, Agent, or Firm* — Maschoff Gilmore & Israelsen (57) ABSTRACT A communication apparatus includes: a display unit; a receiver configured to receive an email; a storage unit configured to store the email; and an unread email notifying unit configured to display on the display unit an image associated with a character string obtained by analyzing at least one of a header and a text of an unread email stored in the storage unit based on an analysis rule.

18 Claims, 6 Drawing Sheets

U.S. PATENT DOCUMENTS

| | | | |
|---|---|---|---|
| 2004/0172455 A1* | 9/2004 | Green et al. | 709/207 |
| 2005/0038863 A1* | 2/2005 | Onyon et al. | 709/207 |
| 2005/0120306 A1* | 6/2005 | Klassen et al. | 715/765 |
| 2005/0256378 A1* | 11/2005 | Takai et al. | 600/300 |
| 2009/0013275 A1* | 1/2009 | May et al. | 715/765 |

* cited by examiner

22a: RECEIVED MAIL

| 22b RECEIVED MAIL IDENTIFIER | 22c RECEPTION STATUS | 22d TIME | 22e SENDER ADDRESS | 22f SUBJECT | 22g TEXT | 22h CONTENT OVERVIEW |
|---|---|---|---|---|---|---|
| 11 | UNRECEIVED | – | – | – | – | UNRECEIVED |
| 12 | UNRECEIVED | – | – | – | – | UNRECEIVED |
|  |  |  |  |  |  |  |
| 21 | COMPLETION OF HEADER RECEPTION | 8:00 APRIL 29 2007 | aaa@aaa.aaa | MEETING |  | WORK (TENTATIVE) |
| 22 | COMPLETION OF HEADER RECEPTION | 8:00 APRIL 26 2007 | bbb@bbb.bbb | PARTY | – | LEISURE |
| 23 | COMPLETION OF HEADER RECEPTION | 8:00 APRIL 23 2007 | ccc@ccc.ccc | – | – | Mr. ccc |
|  |  |  |  |  |  |  |
| 31 | COMPLETION OF TEXT RECEPTION | 8:00 APRIL 28 2007 | aaa@aaa.aaa | MEETING | BARBECUE | LEISURE |
| 32 | COMPLETION OF TEXT RECEPTION | 8:00 APRIL 25 2007 | aaa@aaa.aaa | MEETING | BUSINESS OFFICE | HOTEL |
| 33 | COMPLETION OF TEXT RECEPTION | 8:00 APRIL 22 2007 | aaa@aaa.aaa | MEETING | REPORT | WORK |
| 34 | COMPLETION OF TEXT RECEPTION | 8:00 APRIL 21 2007 | ccc@ccc.ccc | BUSINESS TRIP | BUSINESS OFFICE | Mr. ccc |
|  |  |  |  |  |  |  |
| 41 | ALREADY-READ | 8:00 APRIL 27 2007 | ddd@ddd.ddd | MEETING | BARBECUE | – |
| 42 | ALREADY-READ | 8:00 APRIL 24 2007 | ccc@ccc.ccc | BUSINESS TRIP | BUSINESS OFFICE | – |
|  |  |  |  |  |  |  |

FIG. 3

24a: ANALYSIS RULES

| RULE NUMBER | RECEPTION STATUS | SENDER ADDRESS | RECEIVED MAIL CONTENT | CONTENT OVERVIEW |
|---|---|---|---|---|
| 1 | UNRECEIVED | - | - | UNRECEIVED |
| 2 | - | ccc@ccc.ccc | - | Mr. ccc |
| 3 | COMPLETION OF HEADER RECEPTION | - | MEETING, REPORT | WORK (TENTATIVE) |
| 4 | COMPLETION OF HEADER RECEPTION | - | PARTY, BARBECUE | LEISURE |
| 5 | COMPLETION OF HEADER RECEPTION | - | - | INDEFINITE |
| 6 | COMPLETION OF TEXT RECEPTION | - | TRIP, BUSINESS OFFICE | HOTEL |
| 7 | COMPLETION OF TEXT RECEPTION | - | MEETING, REPORT | WORK |
| 8 | COMPLETION OF TEXT RECEPTION | - | PARTY, BARBECUE | LEISURE |
| 9 | COMPLETION OF TEXT RECEPTION | - | - | INDEFINITE |
| 10 | - | STORED IN ADDRESS BOOK | - | MAIL FROM ACQUAINTANCE |
| 11 | - | NOT STORED IN ADDRESS BOOK | - | MAIL FROM UNKNOWN |

24b: ANALYSIS RESULT IMAGE CORRESPONDENCE

| CONTENT OVERVIEW | IMAGE IDENTIFIER |
|---|---|
| UNRECEIVED | QQQ |
| Mr. ccc | UUU |
| WORK (TEMP) | SSS |
| LEISURE | PPP |
| HOTEL | VVV |
| WORK | RRR |
| INDEFINITE | WWW |
| MAIL FROM ACQUAINTANCE | XXX |
| MAIL FROM UNKNOWN | YYY |

24c: IMAGE INFORMATION

| IMAGE IDENTIFIER (24k) | IMAGE DATA (24m) |
|---|---|
| PPP | ☺ |
| QQQ | (envelope) |
| RRR | ☀ |
| SSS | ★ |
| TTT | ☹ |
| UUU | ⚡ |
| VVV | ☾ |
| WWW | ✉ |
| XXX | ♛ |
| YYY | ❗ |

FIG. 6

32a: ADDRESS BOOK

| NAME (32b) | TELEPHONE NUMBER (32c) | EMAIL ADDRESS (32d) |
|---|---|---|
| AAA | 1111 | aaa@aaa.aaa |
| BBB | 2222 | bbb@bbb.bbb |
| CCC | 3333 | ccc@ccc.ccc |
| DDD | 4444 | ddd@ddd.ddd |
| EEE | 5555 | eee@eee.eee |
|  |  |  |

COMMUNICATION APPARATUS

The entire disclosure of Japanese Patent Application No. 2007-217358 filed on Aug. 23, 2007 including specification, claims, drawings and abstract is incorporated herein by reference in its entirety.

BACKGROUND OF THE INVENTION

1. Field of the Invention

The present invention relates to a communication apparatus, and particularly to a processing of notifying the presence of an unread email.

2. Description of the Related Art

In a communication apparatus having a function of transmitting and receiving emails, there is known a processing of displaying any notifying addresses of emails of senders who transmit the emails. Moreover, there is also known a processing of converting the addresses into sender names of the emails with reference to an address book to display the sender names instead of displaying the addresses of the emails.

There is also known a processing of notifying the presence of emails to display the presence, when there are the emails which arrive in an email server but are not received or when there are emails (emails of which texts have been not displayed on a display unit) which are received but are not read. Moreover, there is also known a processing of selecting and displaying one image among plural images in accordance with the text contents of the received emails (see JP-A-2005-316650 (pages 2, 3, and 7 and FIGS. 11 and 12), for instance).

In the technique disclosed in the JP-A-2005-316650, however, one cannot summarily grasp the respective contents of the plural unread emails. For that reason, it is difficult to use the technique in determining which email is to be read. Moreover, one cannot even know the summaries of the received email by the time when a certain operation to read emails (for example, opening a list of the received emails, etc) is performed.

SUMMARY OF THE INVENTION

According to one aspect of the invention, a communication apparatus includes: a display unit; a receiver configured to receive an incoming email; a storage unit configured to store the incoming email; and an unread email notifying unit configured to display on the display unit an image associated with a character string obtained by analyzing at least one of a header and a text of an unread email stored in the storage unit based on an analysis rule.

BRIEF DESCRIPTION OF THE DRAWINGS

Embodiment may be described in detail with reference to the accompanying drawings, in which.

DETAILED DESCRIPTION OF THE INVENTION

Figure 1:
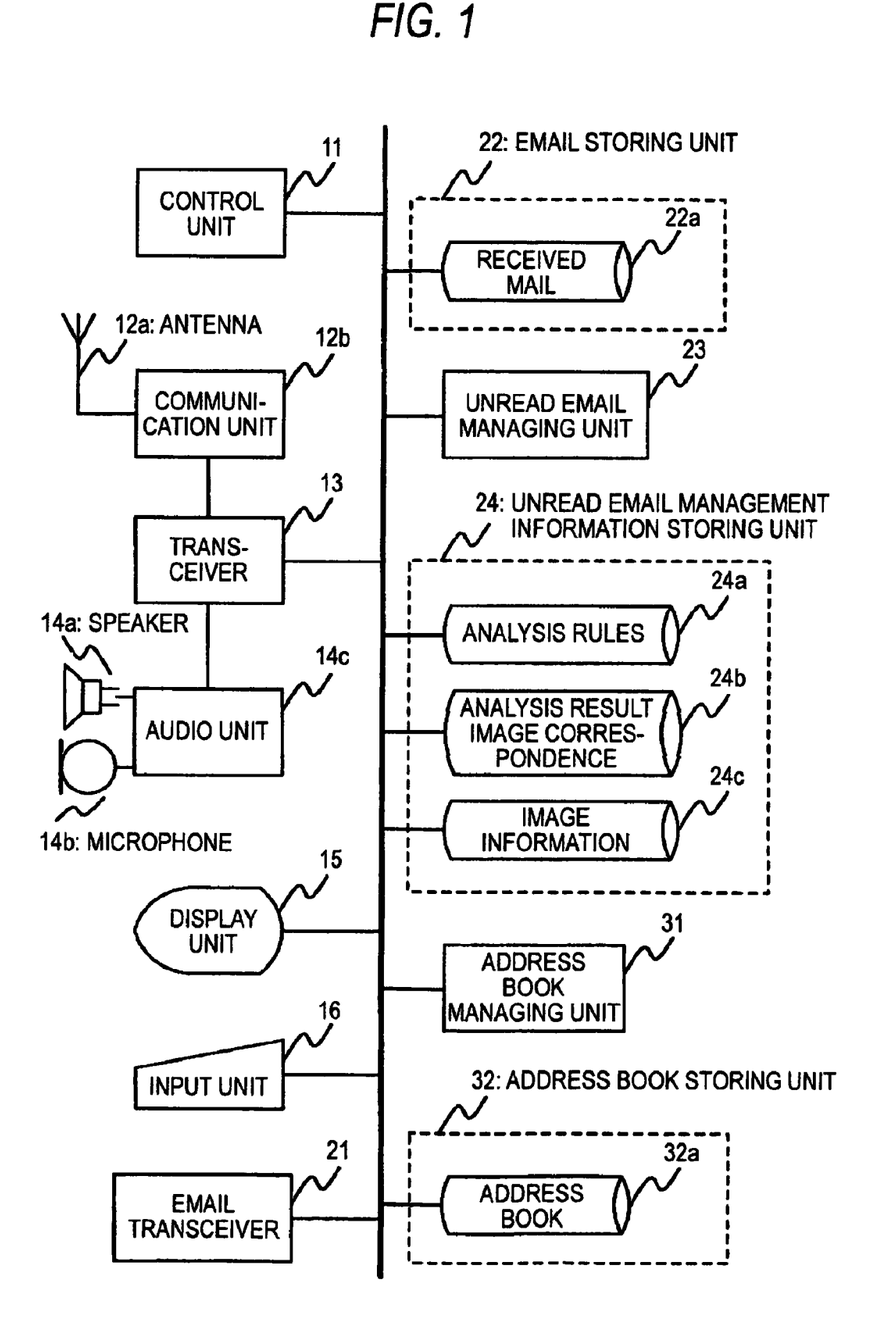
FIG. 1 is a block diagram showing the configuration of a mobile communication apparatus according to the embodiment.

Hereinafter, a communication apparatus according to an exemplary embodiment will be described with reference to the drawings. FIG. 1 is a block diagram showing the configuration of a mobile communication apparatus to which the communication apparatus according to the embodiment is applied. The mobile communication apparatus includes a control unit 11 which controls the entire apparatus, an antenna 12a which transmits and receives radio waves to and from a base station (not shown) for communication through a mobile communication network, a communication unit 12b, a transceiver 13, a speaker 14a, a microphone 14b, an audio unit 14c, a display unit 15, an input unit 16, an email transceiver 21, an email storing unit 22, an unread email managing unit 23, an unread mail management information storing unit 24, an address book managing unit 31, and an address book storing unit 32.

The email storing unit 22 stores received mails 22a. The unread mail management information storing unit 24 stores analysis rules 24a, analysis result image correspondences 24b, and image information 24c. The address book storing unit 32 stores an address book 32a.

According to the embodiment, operations of the units of the mobile communication apparatus having the above-described configuration will be described with reference to FIG. 1.

When the transceiver 13 receives an incoming signal of call, the control unit 11 notifies a user of an incoming call and urges the user to perform a call-in operation. When the transceiver 13 receives an incoming signal of an email, the control unit 11 notifies the email transceiver 21 of the incoming signal of an email. In this case, the incoming signal of an email is transmitted by an email server (not shown), when a received mail for the mobile communication apparatus is received by the email server.

The communication unit 12b outputs a high frequency signal received by the antenna 12a to the transceiver 13, and allows the antenna 12a to transmit a high frequency signal output from the transceiver 13.

The transceiver 13 performs amplification, frequency conversion, and demodulation of the high frequency signal transmitted from the communication unit 12b. The transceiver 13 transmits a digital voice signal obtained in this manner to the audio unit 14c, transmits an email to the email transceiver 21, and transmits a control signal to the control unit 11. The digital voice signal output from the audio unit 14c, the email output from the email transceiver 21, and the control signal output from the control unit 11 are subjected to modulation, frequency conversion, and amplification to obtain a high frequency signal. The high frequency signal is transmitted to the communication unit 12b.

The audio unit 14c converts the digital voice signal output from the transceiver 13 into an analog voice signal, amplifies the analog voice signal, and transmits the analog voice signal to the ear speaker 14a. Moreover, the audio unit 14c amplifies an analog voice signal output from the mouth microphone 14*b*, converts the analog voice signal into the digital voice signal, and transmits the digital voice signal to the transceiver 13.

The display unit 15, which is a Liquid Crystal Display (LCD), for example, is controlled by the control unit 11 to display characters, numerals, and image data. The displayed data is converted by receiving a command from the control unit 11 in response to an input operation at the input unit 16 or the incoming signal The input unit 16 includes character keys, numeral keys used to designate a telephone number of a communication opponent, and plural function keys. When the keys of the input unit 16 are operated, the key input is received and identifiers of the keys are notified to the control unit 11. A processing unit receives the identifiers via the control unit 11. The identifiers are displayed on the display unit 15 as characters by the control unit 11 and the processing unit, or an operation is performed.

The email transceiver 21 transmits and receives the email and displays the received email. An email transmitting operation of the email transceiver 21 is activated by a certain key manipulation at the input unit 16. A subject and a text of a transmitting mail prepared by a certain key manipulation at the input unit 16 are transmitted through the transceiver 13.

An email receiving operation of the email transceiver 21 is activated by the control unit 11, when the transceiver 13 receives the incoming signal of the email. The receiving of the email from the email server is performed. In this case, the email receiving operation is one of the following three operations.

In a first email receiving operation, an email related to the incoming signal is not received and the fact that the unreceived email is present is stored in the received mail 22*a*. In a second email receiving operation, a header containing a subject of the email is received and information related to the received email is stored in the received mail 22*a*. In a third email receiving operation, the header and a text of the email is received and information related to the received email is stored in the received mail 22*a*.

In the second email receiving operation, a portion of the header and/or the text of the email may be received. So that the rest of the header and/or the text of the email, including an attached file, may be received in the third email receiving operation.

An operation of displaying the received email by the email transceiver 21 is performed by a certain key manipulation at the input unit 16 to display the received mail 22*a* on the display unit 15. In this case, when the header and/or the text of the received mail 22*a* are not received, the email transceiver 21 receives the header and/or the text of the received mail 22*a* before the displaying operation.

When the received mail 22*a* is not read, the unread email managing unit 23 notifies that the unread email is present by displaying it on the display unit 15. The unread read mail means that the text of the received mail 22*a* is not displayed on the display unit 15 and includes a case where the text is not received. In this case, the received mail 22*a* of which the text is not read is one of the following three emails. As for a first email, neither the header nor the text have not been received. As for a second email, the header has been received, but the text has not been received. As for a third email, the header and the text have been received, but the text has not been displayed on the display unit 15.

That is, the unread email managing unit 23 analyzes the respective received mails 22*a* having not been read with reference to the analysis rules 24*a* to obtain the content overview of the respective received mails 22*a*. Sequentially, the content overview obtained by the analysis is converted into an image identifier with reference to the analysis result image correspondences 24*b*. Sequentially, an image identified by the converted identifier is retrieved from the image information 24*c* to display the retrieved image on the display unit 15. In this case, when plural unread received mails 22*a* are present, the plural searched images are displayed.

The address book managing unit 31 manages the address book 32*a*. That is, the address book 32*a* is activated by control of the control unit 11 to display information stored in the address book 32*a* on the display unit 15. Input information is newly stored in the address book 32*a* by a certain key manipulation at the input unit 16. Information stored in the address book 32*a* is updated by a certain key manipulation at the input unit 16 and the updated information is stored in the address book 32*a*. A part or the entire of the information stored in the address book 32*a* is deleted by a certain key manipulation at the input unit 16.

Hereinafter, an operation of notifying the overviews of the unread emails and display an arbitrary email among the emails in the mobile communication apparatus according to the embodiment will be described.

Figure 2:
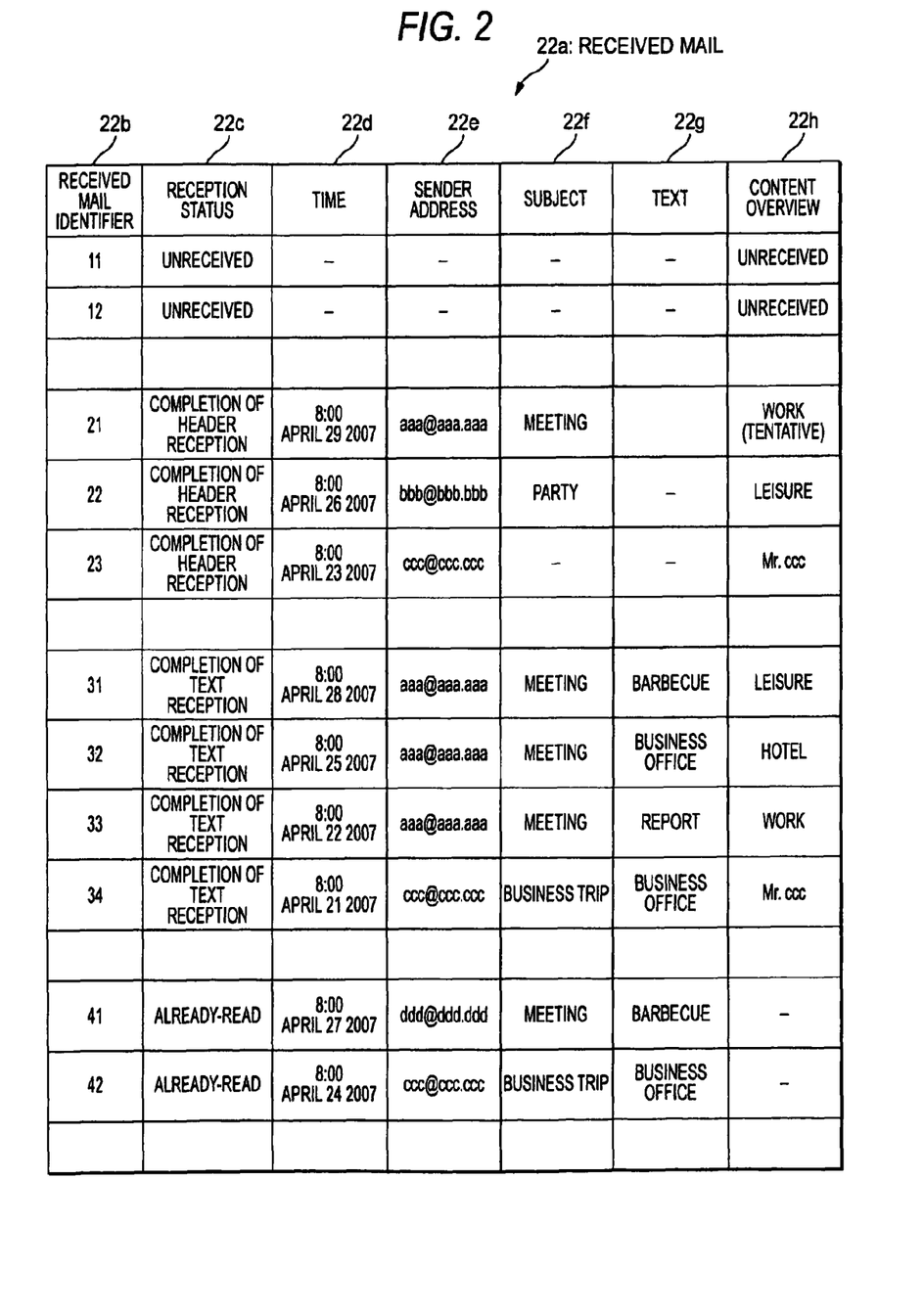
FIG. 2 is diagram showing a configuration example of a received mail stored according to the embodiment.

FIG. 2 is diagram showing a configuration example of the received mail 22*a* stored in the email storing unit 22. The received mail 22*a* includes a received mail identifier 22*b*, reception status 22*c*, data 22*d*, a sender address 22*e*, a subject 22*f*, a text 22*g*, and a content overview 22*h* as information associated with each other. One set of the associated information indicates one received mail 22*a*. In FIG. 2, the associated information stored in an adjacent manner is shown just for easy understanding. However, the storage structure is not limited thereto.

The received mail identifiers 22*b* are identifiers for uniquely identifying the received mails 22*a* from each other. For example, when the reception status 22*c* described below is "unreceived", "completion of header reception", "completion of text reception", and "already-read", the received mail identifier 22*b* has a larger value in a sequence. When the reception status 22*c* is equal, the received mail identifier 22*d* has a smaller value in earlier time, which is described below, and has a larger value in later time. The received mail identifier 22*b* is not changed as long as the corresponding reception status 22*c* is not changed into different information.

The received mails 22*a* are sorted and stored in such manner that information on the received mail identifier 22*b* having a smaller value is sorted prior to information on the received mail identifier 22*b* having a larger value. However, the large and small values of the received mail identifiers 22*b* may not be determined in accordance with the sequence. In addition, the received mail identifiers 22*b* indicates the sequence used when the email transceiver 21 displays the received mails 22*a*, but are not necessarily required. It is sufficient that the received mails 22*a* are sorted in the above-described manner. In addition, the sorting may not specify the storage sequence. The received mails 22*a* can be sorted by appropriately using a pointer.

The reception status 22*c* indicates one of four steps while the received mail 22*a* is received and the text 22*g* of the received mail 22*a* is displayed on the display unit 15. The reception status 22*c* is one of the following four types of information. First information relates to "unreceived". The first information indicates a step of receiving the incoming signal of the email 22*a* and indicates that the header and the text of the email have not been received.

Second information relates to "completion of header reception". The second information indicates a step of completing the header reception of the received mail 22a and not receiving the text thereof. Third information relates to "completion of text reception". The third information indicates a step of completing reception of the header and text of the received mail 22a and riot displaying the text on the display unit 15. Fourth information relates to "already-ready". The fourth information indicates a step of displaying the text of the received mail 22a on the display unit 15.

The time 22d indicates time of receiving the received mail 22a. When the reception status 22c indicates "the completion of header reception", time of receiving the header of the received mail 22a is stored as the time 22d. When the reception status 22c indicates "the completion of text reception" and the reception status 22c indicates "already-read", time of receiving the text of the received mail 22a is stored as the time 22d. When the reception status 22c indicates "unreceived", time is not stored as the time 22d, but the invention is not limited thereto. For example, time of receiving the incoming signal of an email may be stored.

The sender address 22e is included in the header of the received mail 22a. The email address of a sender transmitting the received mail 22a is stored. When the reception status 22c indicates "unreceived", the email address is not stored in the sender address 22e. That is because the sender address 22e is obtained by analyzing the received header.

A subject included in the header of the received mail 22a is included as the subject 22f. When the reception status 22c indicates "unreceived" and information is not included in the subject of the received mail 22a, information is not stored as the subject 22f.

A text of the received mail 22a is stored as the text 22g is stored. When the reception status 22c indicates "unreceived", the reception status 22c indicates "the completion of header reception", and the text of the received mail 22a is not present, information is not stored as the text 22g.

The content overview 22h is information indicating the contents of the email obtained by analyzing the subject 22f and the text 22g of the received mail 22a.

When information a the subject and the text of the received mail 22a is not present at the time of transmitting the received mail 22a by the sender, the subject 22f or the text 22g is not stored regardless of reception completion.

In this embodiment, the received mail 22a is stored in the email storing unit 22, but the invention is not limited thereto. A copy of the transmitted email may be stored.

Figure 3:
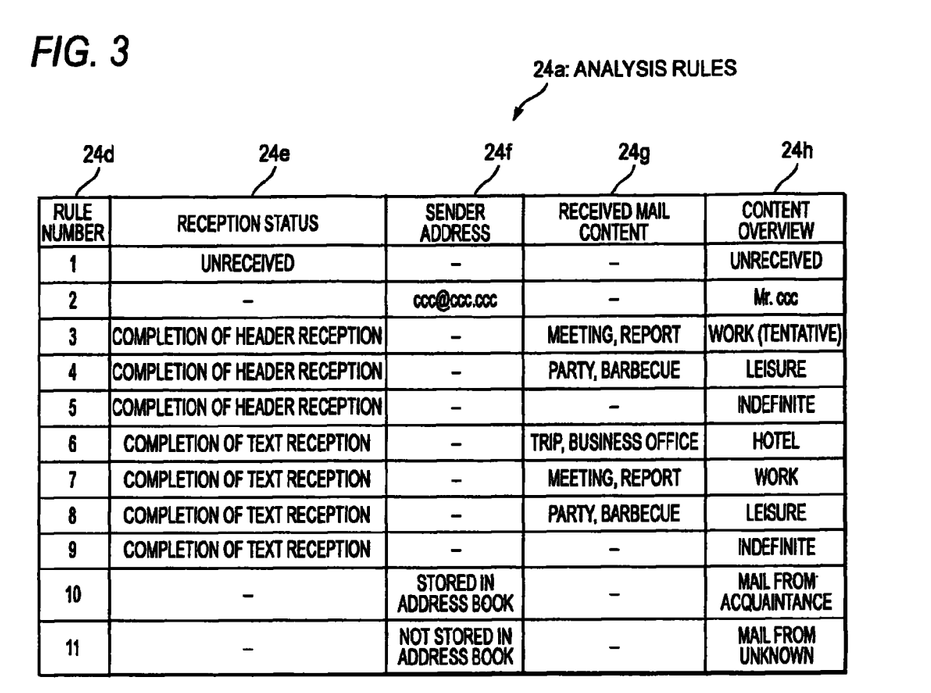
FIG. 3 is a diagram showing a configuration example of an analysis rule according to the embodiment.

FIG. 3 is a diagram showing a configuration example of the analysis rules 24a stored in the unread mail management information storing unit 24. The analysis rules 24a includes a rule number 24d, a reception status 24e, a sender address 24f, received mail content 24g, and a content overview 22h as information associated with each other. One set of the associated information indicates one analysis rules 24a. In FIG. 3, the associated information stored in an adjacent manner is shown just for easy understanding. However, the storage structure is not limited thereto.

The rule numbers 24d are natural numbers for uniquely identifying the analysis rules 24a from each other. The analysis rules 24a are sorted and stored in a sequence from a smaller rule number 24d to a larger rule number 24d. However, the rule number 24d is not necessarily required. It is sufficient that the analysis rules 24a are sorted in the above-described manner. However, the large and small values of the received mail identifiers 22b may not be determined in accordance with the sequence. In addition, the sorting may not specify the storage sequence. The analysis rules 24a can be sorted by appropriately using a pointer.

The reception status 24e is the same as the reception status 22c of the received mail 22a. In addition, the sender address 24f is the same as the sender address 22e of the received mail 22a. Alternatively, the sender address 24f may be information of "stored in an address book" or information of "not stored in an address book". Alternatively, the sender address 24f may be the above-described plural information.

The received mail content 24g relates to one or plural keywords, a character string, or an utterance indicating a concept. Some arbitrary information of the reception status 24e, the sender address 24f, and the received mail content 24g may not be stored. That fact that the information is not stored is presented by "-" in FIG. 3.

A condition of the analysis rules 24a is defined by the reception status 24e, the sender address 24f, and the received mail content 24g. In addition, when the reception status 22c, the sender address 22e, the subject 22f, and the text 22g of one received mail 22a satisfy the condition, the content overview 22h shows the contents of the received mail 22a.

Figure 4:
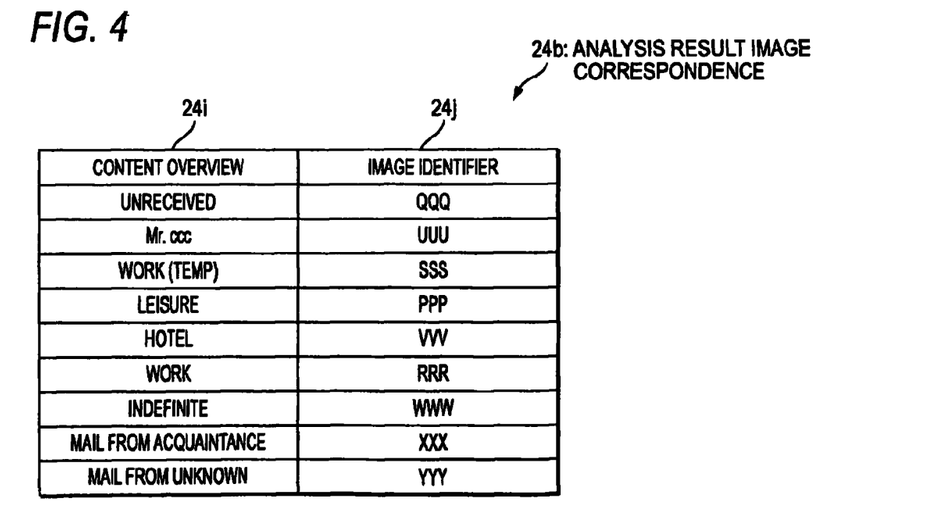
FIG. 4 is a diagram showing a configuration example of an analysis result image correspondence according to the embodiment.

FIG. 4 is a diagram showing a configuration example of the analysis result image correspondence 24b stored in the unread mail management information storing unit 24. The analysis result image correspondence 24b includes a content overview 24i and an image identifier 24j as information associated with each other. One set of the associated information indicates one analysis result image correspondence 24b. In FIG. 4, the associated information stored in an adjacent manner is shown just for easy understanding. However, the storage structure is not limited thereto.

The content overview 24i is the same as the content overview 24h of the analysis rules 24a. The image identifiers 24j are identifiers for uniquely identifying images from each other stored in the image information 24c described below.

Figure 5:
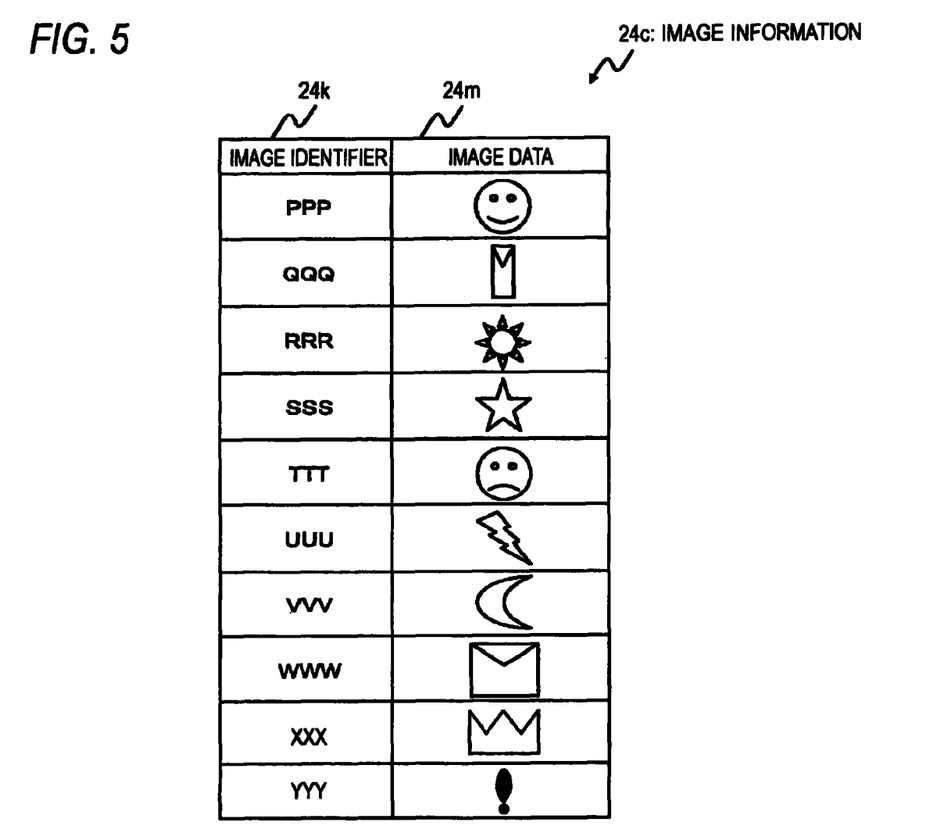
FIG. 5 is a diagram showing a configuration example of image information according to the embodiment.

FIG. 5 is a diagram showing a configuration example of the image information 24c stored in the unread mail management information storing unit 24. The image information 24c includes an image identifier 24k and image data 24m as information associated with each other. In addition, one set of the associated information indicates one image information 24c. In FIG. 5, the associated information stored in an adjacent manner is shown just for easy understanding. However, the storage structure is not limited thereto.

In particular, the image data 24m is stored as a file or stored in an image data storage area since the image data 24m requires much storage capacity. A name of the file or an address indicating a position of the storage area and a position at which certain image data is stored may be stored in the image data 24m. Alternatively, the image data 24m is stored as a file, and a name of the file may be used as the image identifier 24k.

The image identifiers 24k are identifiers for uniquely identifying images stored in the image information 24c from each other and are the same information as the image identifiers 24j of the analysis result image correspondences 24b. The image data 24m is information on a stationary image, for example. The stationary image may be encoded. Alternatively, the stationary image may be a character or an icon. Alternatively, the image data 24m is information on a video clip. The video clip may be an encoded video clip or a vector image. Alternatively, the video clip may be an image where plural stationary images are displayed at a certain time interval.

Figure 6:
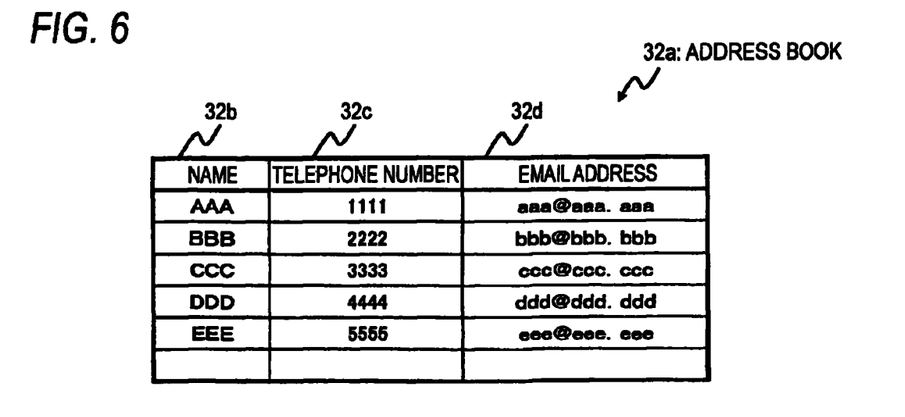
FIG. 6 is a diagram showing a configuration example of an address book according to the embodiment.

FIG. 6 is a diagram showing a configuration example of the address book 32a. The address book 32a includes a name 32b, a telephone number 32c, and an email address 32d as information associated with each other. In addition, one set of the associated information indicates one sender address. In FIG. 6, the associated information stored in an adjacent manner is shown just for easy understanding. However, the storage structure is not limited thereto.

Next, an email receiving operation and an email displaying operation of the email transceiver 21 will be described, focusing an operation of storing the received email in the received mail 22a. The email receiving operation of the email transceiver 21 is activated when the transceiver 13 receives the incoming of the email and when a certain key manipulation at the input unit 16 is performed during the display of the received mail 22a. When the transceiver 13 receives the incoming signal of an email, one of the following three operations is performed.

A first operation is as follows. That is, the email transceiver 21 does not receive an email associated with the incoming signal. Information associated with the number of the incoming signals for the received emails is further stored in the received mail 22a. The information is the reception status 22c of "unreceived". Information is not stored in the time 22d, the sender address 22e, the subject 22f, the text 22g and the content overview 22h.

As described above, the information which is appropriately set is stored as the received mail identifier 22b. Next, the email transceiver 21 notifies the unread email managing unit 23 that the information has been further stored in the received mail 22a. At this time, the set received mail identifier 22b is also notified as a parameter.

As described below, the notifying to the unread email managing unit 23 means that an operation of updating the images displayed on the display unit 15 is instructed to the unread email managing unit 23 to inform the presence of the unread received mail 22a, regardless of the contents of the notifying. In addition, the notifying of the received mail identifier 22b as the parameter means that an operation of obtaining an image corresponding to the received mail 22a identified by the received mail identifier 22b is instructed to the unread email managing unit 23.

In the received mails 22a exemplified in FIG. 2, information associated with the received mail identifier 22b of "11" and information associated with the received mail identifier 22b of "12" are examples of the information stored by the first operation.

The first operation is an operation performed when the incoming signal of the email is received. The first operation is performed when the first operation is set so as to be performed, or when the receiving is not possible since the communication state between the communication apparatus and the base station gets worse during receiving the email in a state where the header of the email is set so as to be received, or the header and the text of the email is set to be received.

A second operation is as follows. That is, the email transceiver 21 receives the header of the electronic header associated with the incoming signal. And, information associated with the number of the emails of which the headers are received is further stored in the received mail 22a. The information is the reception status 22c of "the completion of header reception", the time 22d which is the time of receiving the header, the sender address 22e which is an address contained in the received header and associated with the transmission of the email, and the subject 22f contained in the header.

Information is not stored in the text 22g and the content overview 22h. The appropriately set information is stored as the received mail identifier 22b, as described above. Next, the email transceiver 21 notifies the unread email managing unit 23 that the information has been stored in the received mail 22a. At this time, the set received mail identifier 22b is notified as a parameter.

In the received mails 22a exemplified in FIG. 2, information associated with the received mail identifier 22b of "21", information associated with the received mail identifier 22b of "22", and information associated with the received mail identifier 22b of "23" are examples of the information stored by the second operation.

The second operation is an operation performed when the incoming signal of the email is received. The second operation is performed when the second operation is set so as to be performed, or when the receiving of the text is not possible since the communication state between the communication apparatus and the base station gets worse during receiving the text of the email after the header of the email is received in a state where the header and the text of the email is set so as to received.

A third operation is as follows. That is, the email transceiver 21 receives the header and the text of the electronic header associated with the incoming signal. And, information associated with the number of the received emails is further stored in the received mail 22a. The information is the reception status 22c of "the completion of text reception", the time 22d which is the time of receiving the text, the sender address 22e which is an address contained in the received header and associated with the transmission of the email, the subject 22f contained in the header, and the text 22g of the email.

Information is not stored in the content overview 22h. The appropriately set information is stored as the received mail identifier 22b, as described above. Next, the email transceiver 21 notifies the unread email managing unit 23 that the information has been stored in the received mail 22a. At this time, the set received mail identifier 22b is notified as a parameter.

In the received mails 22a exemplified in FIG. 2, information associated with the received mail identifiers 22b of "31" to "34" is an example of the information stored by the third operation. The third operation is an operation performed when the incoming signal of the email is received. As an operation performed when the incoming signal of the email is performed, the second operation when the header and the text of the email is set so as to be received.

Next, a received mail displaying operation of the email transceiver 21 and a received mail receiving operation thereof during the displaying operation will be described. The received mail displaying operation of the email transceiver 21 is activated by a certain key manipulation at the input unit 16 to display at least one of the time 22d, the sender address 22e, the subject 22f, and the text 22g of the received mail 22a on the display unit 15. In addition, the received mail 22a where the reception status 22c is "unreceived" is not displayed since any one of the above-described information is not stored.

In addition to the displaying operation, the email transceiver 21 performs the following four updating and storing operations of the received mail 22a in accordance with certain key manipulations at the input unit 16 or in accordance with the setting in addition to the certain key manipulations. The updating and storing operations are accompanied with the email receiving operation in many cases. In addition, the email transceiver 21 performs deleting the received mail.

A first updating and storing operation is as follows. That is, when the reception status 22c of "unreceived" is present in the received mail 22a, the email transceiver 21 makes request to the email server and the email server stores the fact. Then, the email transceiver 21 receives the header of the email which has not been received. Sequentially, as for every received email, information associated with the received email is updated and stored in the received mail 22a.

The information is the reception status 22c updated from "unreceived" to "the completion of header reception, the time 22*d* which is time of receiving the header, the sender address 22*e* which is an address contained in the received header and associated with transmission of the email, and the subject 22*f* contained in the header.

When the plural reception statuses 22*c* of "unreceived" are present, the email transceiver 21 receives all the headers of the emails. However, the invention is not limited thereto. The header of one email may be received by one-time key manipulation.

As described above, as for the received mail identifier 22*b*, appropriately updated information is stored. The information stored in the content overview 22*h* is deleted. Information is not stored in the text 22*g*. Next, the email transceiver 21 notifies the unread email managing unit 23 that the information has been updated and stored in the received mail 22*a*. At this time, the updated received mail identifier 22*b* is also notified as a parameter.

A second updating and storing operation is as follows. That is, when the reception status 22*c* of "unreceived" is present in the received mail 22*a*, the email transceiver 21 makes request to the email server and the email server stores the fact. Then, the email transceiver 21 receives the header and the text of the email which has not been received. Sequentially, as for every received email, information associated with the received email is updated and stored in the received mail 22*a*.

The stored information is the reception status 22*c* updated from "unreceived" to "the completion of text reception, the time 22*d* which is time of receiving the text, the sender address 22*e* which is an address contained in the received header and associated with transmission of the email, the subject 22*f* contained in the header, and the text 22*g* of the email.

When the plural reception statuses 22*c* of "unreceived" are present, the email transceiver 21 receives all the headers and the texts of the emails. However, the invention is not limited thereto. The header of one email may be received by one-time key manipulation. As described above, as for the received mail identifier 22*b*, appropriately updated information is stored. The information stored in the content overview 22*h* is deleted. Next, the email transceiver 21 notifies the unread email managing unit 23 that the information has been updated and stored in the received mail 22*a*. At this time, the updated received mail identifier 22*b* is also notified as a parameter.

A third updating and storing operation is as follows. That is, when the reception status 22*c* of "the completion of header reception" is present in the received mail 22*a*, the email transceiver 21 makes request to the email server and the email server stores the fact. Then, the email transceiver 21 receives the text of the email which has not been received. Sequentially, as for every received email, information associated with the received email is updated and stored in the received mail 22*a*.

The information is the reception status 22*c* updated from "the completion of header reception" to "the completion of text reception, the time 22*d* which is time of receiving the text, the sender address 22*e* which is an address contained in the received header and associated with transmission of the email, the subject 22*f* contained in the header, and the text 22*g* of the email. At this time, the sender address 22*e* and the subject 22*f* are not changed.

When the plural reception statuses 22*c* of "the completion of header reception" are present, the email transceiver 21 transmits the headers of the email to the email server before it receives the texts of the emails, and receives the texts of the email transmitted from the email server and associated with the headers of the emails. However, the invention is not limited thereto. If there is information for uniquely identifying a received mail in both the email server and the mobile communication apparatus, the header is not used and the information is used.

As described above, as for the received mail identifier 22*b*, appropriately updated information is stored. The information stored in the content over view 22*h* is deleted Next, the email transceiver 21 notifies the unread email managing unit 23 that the information has been updated and stored in the received mail 22*a*. At this time, the updated received mail identifier 22*b* is also notified as a parameter.

A fourth updating and storing operation is as follows. That is, when the reception status 22*c* of "the completion of text reception" is present in the received mail 22*a*, the email transceiver 21 selects the received mails 22*a* in which the reception status 22*c* is "the completion of text reception" among the received mails 22*a*, and displays one or plural ones of the subjects 22*f* of the selected received mails 22*a* on the display unit 15. In the displaying, for example, the mail identifiers 22*b* are displayed in a receiving sequence. Sequentially, the text 22*g* associated with the subject 22*f* selected by a certain key manipulation at the input unit 16 is displayed on the display unit 15.

The email transceiver 21 updates the reception status 22*c* associated with the displayed text 22*g* to "already-read" and deletes the information stored in the content overview 22*h* to update and store the received mail 22*a*. In the fourth updating and storing operation, the fact that the information has been updated and stored in the received mail 22*a* is notified to the unread email managing unit 23, but the received mail identifier 22*b* is not notified together as a parameter.

In the received mails 22*a* exemplified in FIG. 2, information associated with the received mail identifiers 22*b* of "41" and "42" is an example of the information stored by the fourth operation.

The above-described operations may not be performed sequentially by the certain key manipulations at the input unit 16. For example, in the fourth updating and storing operation, the email transceiver 21 may select the received mail 22*a* in which the reception status 22*c* is "unreceived" or the received mail 22*a* in which the reception status 22*c* is "the completion of header reception" among the received mails 22*a*.

The email transceiver 21 receives the text 22*g* and the like by performing the second updating and storing operation and performs the fourth updating and storing operation, when the reception status 22*c* associated with the selected subject 22*f* is "unreceived". In addition, the email transceiver 21 receives the text 22*g* and the like by performing the third updating and storing operation and performs the fourth updating and storing operation, when the reception status 22*c* is "the completion of header reception". In this way, when the fourth updating and storing operation is performed after another operation, the email transceiver 21 notifies the unread email managing unit 23 that the information has been updated and stored in the received mail 22*a*, but does not notify the received mail identifier 22*b* together as the parameter.

A received mail deleting operation is as follows. That is, the email transceiver 21 deletes the received mail 22*a* displayed on the display unit 15 in accordance with a certain key manipulation at the input unit 16. The deleted received mail 22*a* may be one or plural ones.

In the received mail deleting operation, the email transceiver 21 notifies the unread email managing unit 23 that the information has been deleted from the received mail 22*a*, when the reception status 22*c* of the deleted received mail 22*a* is "the completion of header reception" or "the completion of text reception". However, the received mail identifier 22*b* is not notified together as the parameter. In addition, the email transceiver 21 does not notify the unread email managing unit 23 that the information has been deleted from the received mail 22a, when the reception status 22c is "already-read"

Next, of the operations of the unread email managing unit 23, an operation of managing the image information 24c stored in the unread mail management information storing unit 24 will be described. The unread email managing unit 23, which is activated by a certain key manipulation at the input unit 16, stores the image identifier 24k and the image data 24m in the image information 24c. The image identifier 24k is input by a certain key manipulation at the input unit 16. The image data 24m is transmitted by the email transceiver 21, for example. Alternatively, the image data 24m is input through a detachable storage medium.

The unread email managing unit 23 displays the image identifier 24k and the image data 24m on the display unit 15. In addition, the unread email managing unit 23 updates and deletes the image identifier 24k and the image data 24m. The update of the image identifier 24k is performed by a certain key manipulation at the input unit 16. The image data 24m is updated by substituting it by other image data.

Next, of the operations of the unread email managing unit 23, an operation of managing the analysis result image correspondence 24b stored in the unread mail management information storing unit 24 will be described. The unread email managing unit 23 inputs the content overview 24i and the image identifier 24j in accordance with a certain key manipulation of the input device 16, newly stores them as the analysis result image correspondence 24b by associating them, and updates them to store them.

The content overview 24i is a character string. The image identifier 24j is the same as the image identifier 24k of the image information 24c. The unread email managing unit 23 displays the image identifiers 24k of the image information 24c on the display unit 15, or may input the image identifiers 24j by selecting them. The unread email managing unit 23 updates and stores the selected one among the displayed analysis image correspondences 24b, or deletes it.

Next, of the operations of the unread email managing unit 23, an operation of managing the analysis rules 24a stored in the unread mail management information storing unit 24 will be described. The unread email managing unit 23 inputs the reception status 24e, the sender address 24f, the received mail content 24g, and the content overview 24h in accordance with a certain key manipulation of the input device 16, newly stores them as the analysis rules 24a by associating them, and updates them to store them. In addition, when the sender address 24f is input, the address book 32a is displayed on the display unit 15. The address book 32a can be also displayed by selection of the displayed email address 32d or the name 32b.

In the storing, the sequence of the analysis rules 24a is significant, and the unread email managing unit 23 performs the storing in an identification sequence of certain key manipulation at the input unit 16. In the example shown in FIG. 3, the sequence of the analysis rules 24a is displayed in accordance with largeness and smallness of the rule numbers 24d. However, the sequence may not be displayed in accordance with the largeness and smallness of the rule numbers 24d. For example, the sequence may be displayed in accordance with stored positions. In this case, the rule number 24d is not required. In addition, the unread email managing unit 23 deletes the selected one among the displayed analysis rules 24a.

Figure 7:
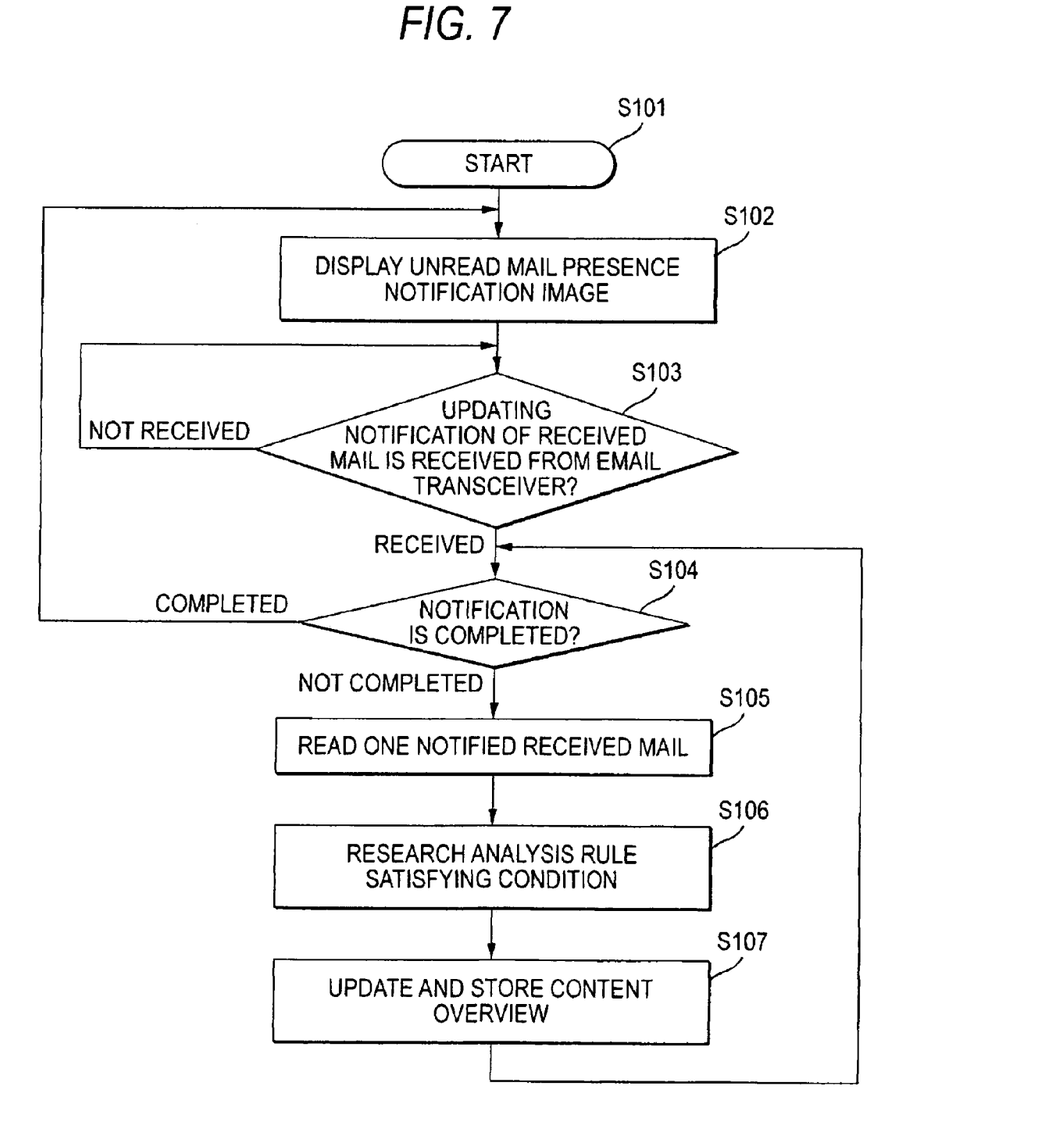
FIG. 7 is a flowchart showing an operation of notifying the presence of the unread mails and an operation of updating and storing the received mails performed by an unread email managing unit according to the embodiment.

Next, of the operations of the unread email managing unit 23, an operation of notifying presence of unread mails and an operation of updating and storing the received mails 22a with reference to the received mails 22a stored in the email storing unit 22 will be described. FIG. 7 is a flowchart showing the operation of notifying presence of the unread mails and the operation of updating and storing the received mails 22a with reference to the received mails 22a stored in the email storing unit 22 of the unread email managing unit 23.

The unread email managing unit 23 starts the above-described operations by inputting a power source of the apparatus (Step S101), and continues to display a presence notification image of the unread mails on the display unit 15 on the basis of the content overview 22h of the received mail 22a (Step S102). In this case, in the inputting of the power source, the content overview 22h stored until cutting the previous power source is displayed. In addition, when the power source is first input to the apparatus, for example, no information is stored in the content overview 22h, thereby displaying no information.

The displaying operation will be described in detail. The unread email managing unit 23 reads the received mails 22a from the top, that is, in a sequence of the received mail identifiers 22b having a smaller value. Sequentially, the analysis result image correspondence 24b of which the convent overview 24i is the same as the content overview 22h of the read received mail 22a is retrieved. Sequentially, the image information 24c of which the image identifier 24k is the same as the image identifier 24j of the retrieved analysis result image correspondence 24b is retrieved. Sequentially, the retrieved image data 24m is obtained. At this time, when the research result cannot be obtained on the basis of the content overview 22h of a received mail 22a, the presence notification image for the received mail 22a is not displayed.

A row of the image data 24m which is obtained from the content overviews 22h shown in FIG. 2 by performing the researching in this manner is as follows: two types of image data 24m (images having a thin long envelop shape) associated with an image identifier 24k of "QQQ", image data 24m (an image having a star shape) associated with an image identifier 24k of "SSS", image data 24m (an image having a facial shape) associated with an image identifier 24k of "PPP", image data 24m (an image having a lightening shape) associated with an image identifier 24k of "UUU", image data 24m (an image having a facial shape) associated with an image identifier 24k of "PPP", image data 24m (an image having a crescent shape) associated with an image identifier 24k of "VVV", image data 24m (an image having a sun shape) associated with an image identifier 24k of "RRR", and the image data 24m (the image having the lightening shape) associated with the image identifier 24k of "UUU".

The unread email managing unit 23 displays the row of the obtained image data 24m on a pict-line of the display unit 15. In this embodiment, the pict-line is a line which is displayed in the top-line section of the display unit 15, and in which there are displayed, for instance, an antenna-shaped image for showing the strength of received radio waves or a battery-shaped image for showing that an electric power level of a battery (not shown) for supplying power to the apparatus is high or low.

The pict-line is constantly displayed irrespective of operational states of the apparatus, for example, whether calling of the audio unit 14c is performed, whether the email transceiver 21 is operated, or whether the address book managing unit 31 is operated. The pict-line is independently displayed from what rest of the display unit 15 displays. Accordingly, the presence of the unread emails can be normally notified by the displaying of the row of the image data 24m.

Figure 8:
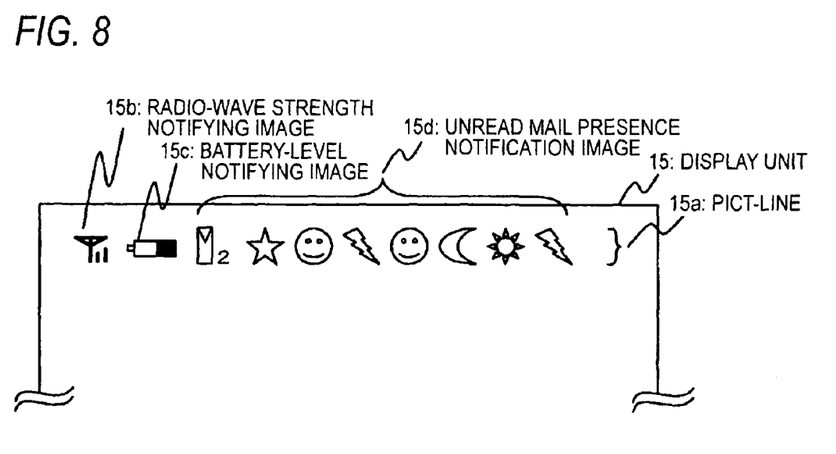
FIG. 8 is a diagram showing a configuration example of a pict-line according to the embodiment.

FIG. 8 is a diagram showing an example of the pict-line. In the pict-line 15a, the row of the image data 24m obtained on the basis of the content overview 22h of the received mail 22a shown in FIG. 2 is displayed. That is, a radio-wave strength notifying image 15b, a battery-level notifying image 15c, and an unread mail presence notification image 15d are displayed sequentially from the left side to the right side.

The radio-wave strength notifying image 15b and the battery-level notifying image 15c are known images, and thus the description is omitted. The unread mail presence notification image 15d is the row of the above-described image data 24m.

In the unread mail presence notification image 15d shown in FIG. 2, one image having the thin long envelop shape is displayed with a numeral "2", instead of the two images having the thin long envelop shape corresponding to the convent overview 22h of "unreceived". In this way, it is easy to display the unread mail presence notification image 15d in one pict-line, when plural unread mails of "unreceived" are present in the content overview 22h.

The reason for displaying the certain image together with its number in this way is that individual contents of the unread emails of which the content overview 22h is "unreceived" cannot be notified and handing the individual unread mails cannot be performed. That is, the handling of the unread mails of which the content overview 22h is "unreceived" is performed in accordance with the header or the header and the text, and the receiving of all the unread mails is just performed.

On the other hand, instead of displaying plural images corresponding to the content overview 22h which is information other than "unreceived", the image may be displayed together with its numeral. In addition, the image may be displayed together with its number only when the plural images are displayed adjacently. Alternatively, the image may be displayed together with its number even when the plural images are not displayed adjacently.

When the image is displayed together with its number, as described below, unread plural emails displayed in the form of the image cannot be specified. Accordingly, when the plural emails are specified, the emails arranged in a certain sequence, for example, the emails of which the received mail identifiers 22b have the small value in the received mails 22a in FIG. 2 are expressed as being specified among the plural emails.

In some cases, the row of the obtained image data 24m may be too long to display all the images in the pict-line of the display unit 15. In this case, the unread email managing unit 23 displays a partial row of the image data 24m related to the received mails 22a of which the received mail identifiers 22b have the small value. The reason for displaying the partial row is that the operation approximately corresponds to displaying a partial row of the image data 24m related to received mails 22a newly arrived in the email server and it is considered that a user is likely to read the newly arrived received mails 22a.

The unread email managing unit 23 displays a partial row of the image data 24m related to the received mails 22a of which the received mail identifiers 22b have the large value. That is because the operation approximately corresponds to displaying a partial row of the image data 24m related to received mails 22a having already arrived in the email server and it is considered that it is necessary for a user to urgently read the received mails 22a having already arrived.

The unread email managing unit 23 displays the row of the obtained image data 24m in plural pict-lines. That is because the displaying the row of the obtained image data 24m as many as possible is necessary for a user.

The unread email managing unit 23 displays the row of the obtained image data 24m so as to be scrolled. Alternatively, the row of the obtained image data 24m may be divided into plural partial rows, so that the divided plural partial rows can be repeatedly displayed sequentially at a certain interval.

The reason for performing these operations is that the displaying all the row of the obtained image data 24m is necessary for a user and it is necessary to prevent usability of an application from degrading. That is, when the plural pict-line are displayed, a screen of the display unit 15 which can be used by an application processing unit, for example, the address book managing unit 31 becomes small, thereby degrading the usability of the application.

Next, the unread email managing unit 23 inspects whether a notification indicating that the received mail 22a has been updated is received from the email transceiver 21 (Step S103). In this case, the updating refers to the fact that any change occurs in the received mail 22a. The updating includes adding information, deleting information, modifying information.

In the receiving of the notification, a notification of the received mail identifier 22b as a parameter is also received if the notification is present. When the updating notification is not received, the unread email managing unit 23 repeatedly inspects at a certain interval whether the notification in Step S103 has been received.

Alternatively, when the notification is received, the unread email managing unit 23 inspects whether the updating notification is completed, that is, an entire operation of performing the notification is completed (Step S104). When the notification is completed, the processing is returned to Step S102 to again prepare the unread mail presence notification image 15d and continuously display it on the display unit 15.

Alternatively, when the updating notification is not completed, the unread email managing unit 23 selects one of notifications which have not been processed and reads the received mail 22a from the email storing unit 22 using the received mail identifier 22b received together with the notification as a research key (Step S105). Sequentially, it is inspected that the received mail 22a satisfies which condition of the analysis rules 24a (Step S106).

In order to research the satisfied condition of the analysis rules 24a, the unread email managing unit 23 reads the analysis rules 24a one by one from the analysis rules 24a having the smaller rule number 24d. Sequentially, it is determined whether the received mail 22a read in Step S105 satisfies the condition of the read analysis rules 24a.

That is, when the reception status 22c is the same as the reception status 24e, the sender address 22e is the same as the sender address 24f, and the received mail 22a analyzed from the subject 22f and/or the text 22g is the same as the received mail content 24g, the unread email managing unit 23 determines that the condition is satisfied to complete the researching operation. Alternatively, when the condition is not satisfied, the unread email managing unit 23 reads the next analysis rules 24a to repeat the above-described determining.

In a case where plural addresses are stored in the plural sender addresses 24f, the unread email managing unit 23 determines that the sender address 22e is the same as the sender address 24f, when the sender address 22e is included in the plural addresses.

In a case where the information of "stored in an address book" is stored in the sender address 24f, the unread email managing unit 23 determines that the sender address 22e satisfies the rule of the sender address 24f, when the sender address 22e is stored as the email address 32d in the address book 32a. Alternatively, the unread email managing unit 23 determines that the sender address 22e does not satisfy the rule of the sender address 24f, when the sender address 22e is not stored. Specifically, in FIG. 3, the rule number 10 indicates that the sender address 24f is characterized as "stored in an address book" irrespective of the reception status 24e and the received mail content 24g referred. In this case, analysis result based on the rule number 10 is "mail from acquaintance" as the content overview 24h.

In a case where the information of "not stored in an address book" is stored in the sender address 24f, the unread email managing unit 23 determines that the sender address 22e satisfies the rule of the sender address 24f, when the sender address 22e is not stored as the email address 32d in the address book 32a. Alternatively, the unread email managing unit 23 determines that the sender address 22e does not satisfy the rule of the sender address 24f, when the sender address 22e is stored. Specifically, in FIG. 3, the rule number 11 indicates that the sender address 24f is characterized as "riot stored in an address book" irrespective of the reception status 24e and the received mail content 24g referred. In this case, analysis result based on the rule number 11 is "mail from unknown" as the content overview 24h.

As described above, when the analysis rules 24a include the rule numbers 10 and 11, the analysis results based on this rule depend on whether the sender address is stored in the address book or not.

In a case where information is not stored in one or plural ones of the reception status 24e, the sender address 24f, and the received mail content 24g, the unread email managing unit 23 determines that the sender address 22e is the same as the sender address 24f, regardless of the detail of the received mail 22a analyzed from the reception status 22c, the sender address 22e, and the subject 22f and/or the text 22g.

Alternatively, in the case where information is not stored in the sender address 22e, the unread email managing unit 23 determines that the sender address 22e is not the same as the sender address 24f, regardless of the sender address 24f. In addition, when the detail of the received mail 22a analyzed from the subject 22f and/or the text 22g is not obtained, the unread email managing unit 23 determines that the detail of the received mail 22a is not the same the received mail content 24g, regardless of the received mail content 24g.

The determining whether the detail of the received mail 22a analyzed from the subject 22f and/or the text 22g is the same as the received mail content 24g is one or combination of the following two operations. That is, as for a first determining operation, the unread email managing unit 23 determines that the detail of the received mail 22a analyzed from the subject 22f and/or the text 22g is the same as the received mail content 24g, when an utterance or a character string contained in the received mail content 24g is included in the subject 22f and/or the text 22g.

As for a second determining operation, the unread email managing unit 23 determines that the detail of the received mail 22a analyzed from the subject 22f and/or the text 22g is the same as the received mail content 24g, when an utterance indicating a concept obtained by analyzing the meaning of the subject 22f and/or the text 22g is included the received mail content 24g. The unread email managing unit 23 determines that the detail of the received mail 22a is the same as the received mail content 24g, when they are determined not to be the same as each other by one or both of the determining operations.

In this case, when it is determined by the subject 22f and/or the text 22g, the unread email managing unit 23 performs the determining first by the text 22g. When the text 22g is not stored or when it is determined not to be same as each other by the text 22g, the determining may be performed by the subject 22f. That is because the detail of the received mail 22a is appropriately expressed since the text 22g is longer information, compared to the subject 22f in many cases.

Alternatively, the unread email managing unit 23 may perform the determining first by the subject 22f, when the subject 22f is not stored or when it is determined that they are not same as each other by the subject 22f, the unread email managing unit 23 may performing the determining by the text 22g. That is because it is considered that the detail of the received mail 22a can be easily determined since the subject 22f is shorter information, compared to the text 22g in many cases and there is a high probability that the subject 22f contains the main point of the detail of the received mail 22a.

The analysis rules 24a satisfying the condition cannot be sometimes retrieved by the researching operation of the unread email managing unit 23. In this case, as described below, the fact that the received mail 22a is not read is not notified. However, such a thing depends on an intention of a user, and there is no difficulty in the operation.

It is also possible that the unread received mail 22a satisfying a certain condition is not notified. In this case, a condition is described by the reception status 24e, the sender address 24f, and the received mail content 24g and information is configured so as not to be stored in the content overview 24h related to the condition. In addition, information stored in the content overview 24h is configured as information which is not stored as the content overview 24i in the analysis result image correspondence 24b.

Alternatively, the analysis rules 24a may be configured so that the received mail satisfies any one of the analysis rules 24a. For example, since the analysis rules 24a shown in FIG. 3 indicate the three analysis rules 24a having the rule numbers 24d "1", "5", and "9". Specifically, when the rule number 24d is "1" is satisfied, the content overview 24h is "unreceived". When the rule number 24d is "5" or "9" is satisfied, the content overview 24h is "indefinite".

Next, the unread email managing unit 23 stores the content overview 24h of the retrieved analysis rules 24a in the content overview 22h of the received mail 22a read in Step S105 to update and store the received mail 22a (Step S107), and the processing is returned to an operation in Step S104 of inspecting whether the notification is completed. In Step S106, when the analysis rules 24a satisfying the condition is not retrieved, new information is not stored in the content overview 22h of the received mail 22a in Step S107.

When the updating is notified, but the received mail identifier 22b is not notified, the unread email managing unit 23 performs the updating notification in Steps S105 to S107. That is, the updating and the storing of information in the content overview 22h of the received mail 22a are not performed.

Figure 9:
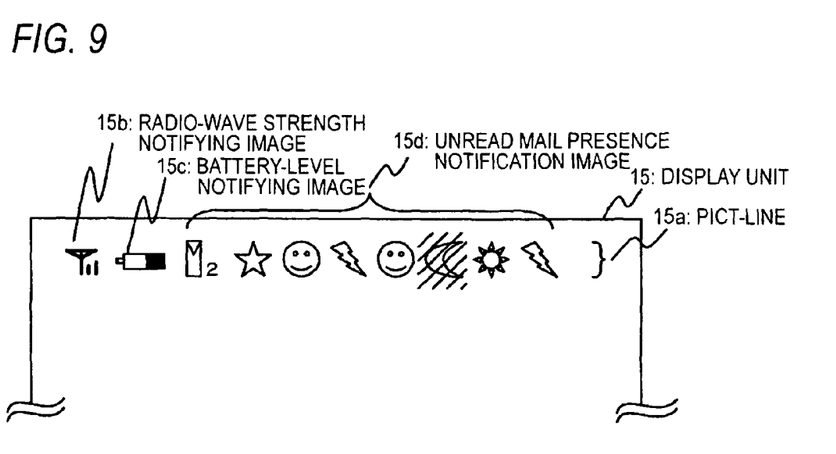
FIG. 9 is a diagram showing another configuration example of the pict-line according to the embodiment.

Next, an operation of receiving the email by the email transceiver 21 through the image data 24m displayed in the pict-line 15a and an operation of displaying the email will be described. FIG. 9 is a diagram showing another example of the row of the image data 24m in the pict-line 15a. In the displaying, the control unit 11 controls one in the row of the image data 24m to be displayed differently in other image data 24m. In addition, the other image data 24m is displayed differently by a certain manipulation at the input unit 16, for example, by moving a cursor or by manipulating one key of up, down, right, and left arrow keys used for scroll.

In this case, examples of the different display includes displaying the image data 24m and/or its background in a different color, displaying the image data 24m and/or its background in different brightness, and displaying the image data 24m and/or its background in a blinking manner. However, the invention is not limited thereto. It is sufficient if the display is distinguished from others. In FIG. 9, the crescent image is distinguished by hatching the crescent image.

When a certain key at the input unit 16, for example, a determination key is manipulated in a state where one of image data 24m is displayed differently in other image data 24m, the control unit 11 controls the email transceiver 21 to activate the received mail identifier 22b corresponding to the image data 24m as a parameter. The received mail identifier 22b corresponding to the image data 24m means that the image data 24m is obtained by researching (researching in Step S106 of FIG. 7) the received mail 22a identified by the received mail identifier 22b.

As described above, the email transceiver 21 performs the operation as the same as the above-described operation when the email the received mail identifier 22b is activated as the parameter by the control unit 11. At this time, the received mail 22a identified by the received mail identifier 22b as the parameter will be operated.

That is, the email transceiver 21 displays the text 22g of the received mail 22a identified by the received mail identifier 22b as the parameter on the display unit 15. When the header and the text of the received mail 22a have not been received and when the header of the received mail 22a has been received, but the text has not been received, the operation of receiving the text is the same as the above-described operation performed by the email transceiver 21. Moreover, the updating of the received mail 22a, the notifying to the unread email managing unit 23, and the non-notifying of the received mail identifier 22b are the same in the above description.

The email transceiver 21 deletes the received mail 22a identified by the received mail identifier 22b as the parameter, when the received mail identifier 22b is activated as the parameter by the control unit 11. The deleting is performed regardless of the fact that the reception status 22c of the received mail 22a is either "the completion of header reception" or "the completion of text reception". The notifying to the unread email managing unit 23 and the non-notifying of the received mail identifier 22b as the parameter are the same as that in the above description.

The email transceiver 21 receives the header of the email to delete the received mail 22a when deleting the received mail 22a of which the reception status 22c is "unreceived". At this time, even through the plural received mails 22a of which the reception status 22c is "unreceived" are present, all the plural received mails 22a are deleted. It is not necessary to delete the received mail 22a after the reception status 22c is updated to "the completion of header reception". Moreover, it is not necessary to perform the notifying to the unread email managing unit 23 twice in the step of receiving the header of the email and the step of deleting the received mail 22a. The notifying is performed in the step of deleting the received mail 22a.

When the email server receives a request for deleting the received mail of which the header and the text have not been received, the email transceiver 21 requests the email server to delete the received mail. The received mail 22a of which the reception status 22c is "unreceived" is deleted. Sequentially, when the fact that the information is deleted from the received mail 22a is notified to the unread email managing unit 23, the received mail identifier 22b is not notified as the parameter.

In addition to the received mail identifier 22b for identifying the received mail 22a, the control unit 11 may also activate the email transceiver 21 to perform an operation such as displaying or deleting as a second parameter with respect to the received mail 22a by manipulating another key at the input unit 16. In addition, the email transceiver 21 may be operated in accordance with the second parameter.

In this way, through the image data 24m displayed in the pict-line 15a, a user can select and read the received mail 22a just by referring the pict-line 15a without activating the email transceiver 21 on the basis of the receiving and displaying of the email by the email transceiver 21. Moreover, the deleting is possible. The selecting is possible in very short time.

For example, when a user who has a schedule for staying in a hotel wants to immediately check the schedule, the user can manipulate a certain key at the input unit 16 at the time of displaying the crescent image shown in FIG. 9 in a different display form in the pict-line 15a. In addition, when a user who is not interested in the received mail 22a of which the sender address 22e is "ccc@ccc.ccc" transmitted from Mr. ccc want to immediately delete the received mail 22a, the user can manipulate a certain key at the input unit 16 at the time of displaying the lightening image shown in FIG. 9 in a different display form in the pict-line 15a.

For example, the content overview 22h having "hotel" information in the received mail 22a shown in FIG. 2 is associated with the image identifier 24j having "VVV" information in the analysis result image correspondence 24b shown in FIG. 4 and is associated with the crescent image of the image data 24m in accordance with the image information 24c shown in FIG. 5. In this way, the image of the image data 24m in which a user is interested can be associated with the detail of the received mail 22a in an arbitrary manner by the user.

In the above description, the condition contained in the analysis rules 24a is described by the reception status 24e, the sender address 24f, and the received mail content 24g. However, the invention is not limited thereto. For example, when the condition is described only by the reception status 24e, the reception status 24e can be classified into three types of "unreceived", "the completion of header reception", and "the completion of text reception to display the number of the unread emails.

Alternatively, when the condition can be described only by the sender address 24f, the presence of the unread email of which the sender address 24f is specified can be notified, or the number of the unread emails from the addresses recorded in the address book 32a and the number of the unread emails from address not recorded in the address book 32a can be notified.

The condition contained in the analysis rules 24a may include time. The time is compared to the time 22d of the received mail 22a and used to determine whether the condition is satisfied. In this case, the comparison is not limited to the sameness or the non-sameness. However, the comparison includes a case where the time is earlier or later than the time 22d. According to the time comparison, for example, the presence of the received mail 22a which has been received a long time ago can be particularly notified.

The condition contained in the analysis rules 24a is the address of a received mail source and may include an address other than the address of a user. In this case, the received mail 22a contains the address of the received mail source. When the address of the received mail source contained in the analysis rules 24a is contained in the address of the received mail source contained in the received mail 22a, both the addresses of the received mail source is determined to be the same one another. According to the determination for the addresses of the received mail source, the detail of the received mail 22a can be inferred, and the presence of the received mail 22a considered as a very important email can be notified.

In the above description, the sequence of the analysis rules 24a is meaningful. That is, the content overview 24h is selected by the analysis rules 24a first satisfying the condition, and moreover the image for notifying the presence of the unread mail displayed on the display unit 15 is selected. However, the invention is not limited thereto.

The analysis rules 24a may not be determined whether to satisfy the condition, but an evaluation frequency may be determined. That is, the evaluation frequency of all the analysis rules 24a is determined. The analysis rules 24a satisfying the condition is the analysis rules 24a to which the highest evaluation frequency is assigned. The determining by the evaluation frequency is particularly effective when the detail of the received mail 22a and a distance of the received mail content 24g are defined.

In the above description, the three types of information, that is, the analysis rules 24a, the analysis result image correspondence 24b, the image information 24c are stored in the unread mail management information storing unit 24. However, the invention is not limited thereto. One type of information may be stored or two types of information may be stored. The number of information types depends on an update frequency of the information.

In the above description, the invention is embodied using the mobile communication apparatus as an example. However, it is apparent that the invention can be applied to all apparatuses capable of receiving emails.

According to the embodiment, the control unit 11, the email transceiver 21, the unread email managing unit 23, and the address book managing unit 31 of the mobile communication apparatus may be a computer operated by a program. The invention is not limited to the above-described configuration, but may be modified in various forms.

What is claimed is:

1. A mobile communication terminal comprising:
a radio interface which communicates with a base station;
a storage unit which stores an email received via the radio interface and a plurality of pictograms, wherein the pictograms indicate (i) that an unread email is stored in the storage unit and (ii) a type of the unread email; and
a control unit which detects a reception status stored in the storage unit of an email in the storage unit, requests a header of the email when the reception status indicates that the header is missing, updates the reception status of the email once the header of the email is received and stored in the storage unit, requests a text of the email when the reception status indicates that the text is missing, updates the reception status of the email once the text of the email is received and stored in the storage unit, detects whether an email in the storage unit remains unread, determines a type of the detected unread email if it is detected that an email remains unread, selects one pictogram from the plurality of pictograms in accordance with the determined type of the detected unread email, and displays the selected pictogram on a display unit while the detected unread email remains unread;
wherein the selected pictogram is displayed in a pictogram display area of the display unit at a position on the display unit that is independent of an operational state of the mobile communication terminal.

2. The mobile communication terminal according to claim 1, wherein the control unit determines the type of the detected unread email by referring to at least one of a subject of the email and a sender email address contained in the email.

3. The mobile communication terminal according to claim 2, wherein the storage unit further stores a table which includes a plurality of sets each comprising a first item including a key word or an email address and a second item including one of the plurality of types, and the control unit determines the type of the detected unread email based on the table.

4. The mobile communication terminal according to claim 1, wherein the selected pictogram is displayed together with a pictogram indicating a battery level in the pictogram display area of the display unit.

5. The mobile communication terminal according to claim 4, wherein the pictogram display area is located at an upper portion of the display unit.

6. The mobile communication terminal according to claim 1, wherein a single reception status indicates that both the header of the email and the text of the email are missing.

7. The mobile communication terminal according to claim 6, wherein the control units simultaneously requests the header of the email and the text of the email when the single reception status indicates that both the header of the email and the text of the email are missing.

8. The mobile communication terminal according to claim 1, wherein the control unit further displays number information indicating a number of unread emails of a same type adjacent to the pictogram corresponding to the type.

9. The mobile communication terminal according to claim 1, wherein the control unit requests the text of the email when the reception status indicates that the text is missing and the header is received and stored in the storage unit.

10. A mobile communication terminal comprising:
a radio interface which communicates with a base station;
a storage unit which stores an email received via the radio interface and a plurality of pictograms, wherein the pictograms indicate (i) that an unread email is stored in the storage unit and (ii) a type of the unread email; and
a control unit which detects a reception status stored in the storage unit of an email in the storage unit, requests a header of the email when the reception status indicates that the header is missing, updates the reception status of the email once the header of the email is received and stored in the storage unit, requests a text of the email when the reception status indicates that the text is missing, updates the reception status of the email once the text of the email is received and stored in the storage unit, classifies the email in the storage unit as a read email or an unread email based on whether or not text of the email has already displayed on a display unit, assigns the unread email to one of a plurality of types if the email is classified as unread email, selects one pictogram from the plurality of pictograms in accordance with the assigned type of the unread email, and displays the selected pictogram on the display unit while the unread email remains unread;
wherein the selected pictogram is displayed in a pictogram display area of the display unit at a position on the display unit that is independent of an operational state of the mobile communication terminal.

11. The mobile communication terminal according to claim 10, wherein the control unit determines the type of the unread email by referring to at least one of a subject of the email and a sender email address contained in the email.

12. The mobile communication terminal according to claim 11, wherein the storage unit further stores a table which includes a plurality of sets each comprising a first item including a key word or an email address and a second item including one of the plurality of types, and the control unit assigns the unread email to one of the plurality of types based on the table.

13. The mobile communication terminal according to claim 10, wherein the selected pictogram is displayed together with a pictogram indicating a battery level in the pictogram display area of the display unit.

14. The mobile communication terminal according to claim 13, wherein the pictogram display area is located at an upper portion of the display unit.

15. The mobile communication terminal according to claim 10, wherein a single reception status indicates that both the header of the email and the text of the email are missing.

16. The mobile communication terminal according to claim 15, wherein the control units simultaneously requests the header of the email and the text of the email when the single reception status indicates that both the header of the email and the text of the email are missing.

17. The mobile communication terminal according to claim 10, wherein the control unit further displays number information indicating a number of unread emails of a same type adjacent to the pictogram corresponding to the type.

18. The mobile communication terminal according to claim 10, wherein the control unit requests the text of the email when the reception status indicates that the text is missing and the header is received and stored in the storage unit.

* * * * *